United States Patent [19]

Hendricks et al.

[11] Patent Number: 5,053,237

[45] Date of Patent: Oct. 1, 1991

[54] METHOD FOR TENDERIZING AND UPGRADING THE SENSORY QUALITIES OF RED MEAT

[76] Inventors: Deloy G. Hendricks, 164 North 300 East, Providence, Utah 84332; Conly L. Hansen, 1310 East 3100 North, Logan, Utah 84321

[21] Appl. No.: 405,683

[22] Filed: Sep. 11, 1989

Related U.S. Application Data

[63] Continuation of Ser. No. 282,386, Dec. 9, 1988, abandoned, which is a continuation of Ser. No. 29,079, Mar. 23, 1987, abandoned.

[51] Int. Cl.$^5$ .............................................. A23L 1/318
[52] U.S. Cl. ..................................... 426/281; 426/641
[58] Field of Search ............... 426/281, 641, 644, 652; 17/51

[56] References Cited

U.S. PATENT DOCUMENTS

| | | | |
|---|---|---|---|
| 2,516,923 | 8/1950 | Schotte | 426/281 |
| 3,016,004 | 1/1962 | Harper, Jr. et al. | |
| 3,119,696 | 1/1964 | Williams | 426/281 X |
| 3,347,679 | 10/1967 | Nordin | 426/281 |
| 3,615,689 | 10/1971 | Malinow et al. | 426/281 |
| 3,649,299 | 3/1972 | Sholl | |
| 3,675,567 | 7/1972 | Rejsa et al. | 99/257 |
| 3,719,504 | 3/1973 | Greenspan et al. | 99/353 |
| 3,739,713 | 6/1973 | Kudale et al. | 99/533 |
| 3,769,037 | 10/1973 | Sholl | 426/281 |
| 3,814,007 | 6/1974 | Lumby et al. | 99/532 |
| 3,835,223 | 9/1974 | Schwall et al. | 426/281 X |
| 3,916,777 | 11/1975 | Earl | 99/533 |
| 4,005,226 | 1/1977 | Dykes et al. | 426/281 |
| 4,008,338 | 2/1977 | Strandine et al. | 426/281 |
| 4,254,151 | 3/1981 | Townsend | 426/231 |
| 4,275,480 | 6/1981 | Norton et al. | 17/25 |
| 4,314,386 | 2/1982 | Easthope et al. | 17/51 |
| 4,411,047 | 10/1983 | Norton | 17/51 |

OTHER PUBLICATIONS

High Pressure Injection of Fluids into Cheese, H. J. Lee et al., Process Biochemistry, Dec. 1978.

*Primary Examiner*—Arthur L. Corbin

[57] ABSTRACT

The present invention relates to methods, compositions, and apparatus for treating and upgrading the tenderness and sensory qualities of fresh red meats. The present invention provides a mechanism whereby low grades of meat may be made tender, flavorful, and juicy without significantly increasing saturated fat content. This is accomplished by injecting the meat with appropriate injectates. Such injectates may include unsaturated vegetable fats such as corn oil, water, and even beef tallow or other saturated fats. It is presently prefereed to include a binder in the injectate such that a substantial portion of the injectate is retained within the meat even after cooking. Failure to provide a binder often results in a drier tasting meat product.

The present invention also teaches the construction of an apparatus which allows injection in a sanitary manner. Additionally, injection can be accomplished such that the meat product may have the appearance of natural marbling.

18 Claims, 9 Drawing Sheets

METHOD FOR TENDERIZING AND UPGRADING THE SENSORY QUALITIES OF RED MEAT

This application is a continuation of U.S. application Ser. No. 07/282,386, filed Dec. 9, 1988, now abandoned, which is a continuation of application Ser. No. 07/029,079, filed Mar. 23, 1987, now abandoned, for METHODS AND COMPOSITIONS FOR TENDERIZING AND UPGRADING THE SENSORY QUALITIES OF RED MEAT.

BACKGROUND

1. Field of the Invention

This invention relates to methods and compositions for tenderizing and upgrading the sensory qualities of fresh red meat. More particularly, the present invention relates to injecting compositions into red meat in order to upgrade its quality, taste, and value.

2. The Background of the Invention

Agriculture in general, and meat production in particular, is presently suffering from very significant economic difficulties including high costs of production and generally deflated market prices for resulting agricultural products. Red meat production is particularly susceptible to these economic factors because red meat is one of the most expensive agricultural products to produce, especially if high quality red meat is desired.

In order to produce very high quality red meat, by current standards, it is necessary to feed the producing animal high quality feeds such as grains, dietary supplements, and other high cost components in order to produce a high quality meat product. In the event that the animal does not receive this high cost diet or is simply allowed to graze, a much poorer quality product is expected.

The rancher or red meat producer is thus faced with a dilemma. He can either go to the expense of producing high quality meat through the use of high quality, high cost animals and feeds, or the rancher can produce a lower quality of meat by less costly methods. The lower quality meat produced, however, commands a much lower price in the marketplace. In using either method of meat production, it is presently difficult for the rancher or farmer to operate profitably.

It is currently the typical practice to fatten cattle at feed lots. This fattening process is very expensive and results primarily in the addition of fats (not protein) to the stock animal. Thus, if a way were developed to fatten animals inexpensively, the positive economic impacts would be very significant.

In some cases, attempts have been made to upgrade lower quality meats in order to produce a better quality product at a reasonable price and thus compete more favorably in the market. These processes usually involve taking intermediate or poor grades of meat and treating them either chemically or mechanically in order to make them more similar to high quality beef.

Probably the most common type of such treatment comprises mechanical tenderization. Mechanical tenderization essentially consists of penetrating the meat product with spikes or knife blades at very close intervals. The penetration by the spikes or knife blades severs the muscle and connective tissue contained within the poor quality cut of beef. This process has a general tenderizing effect in that the tissues which would otherwise make the meat extremely tough have largely been cut. Thus, very tough grades of meat can be tenderized sufficiently to allow sale of the poor quality cut as a commercial product.

Another type of treatment, which has been particularly useful in treating poultry, comprises injection of the meat with a fluid. Such fluids may act to cure the meat, may increase the water content, or in some cases may act as a tenderizer.

Numerous types of injection mechanisms have been employed in the art. For example, some devices employ a plurality of needles which are inserted into the poultry, beef, or other meat. As the needles are removed from the meat, a fluid of a desired type is injected into the space formed by the injection needle. Using this general mechanism, however, little mechanical tenderization is provided.

An alternative method of injection utilizes a plurality of nozzles. The nozzles are connected to a high pressure source of fluid. The nozzles are pressed firmly against the meat, particularly poultry, and then the high pressure source of fluid forces fluid into the meats.

Certain refinements of the nozzle injection method have been developed. These include additional equipment such as a clamp apparatus to hold the poultry in place as the nozzle presses against the opposite side of the subject poultry during injection.

Several problems exist in both the needle injection and the nozzle injection types of apparatus. One major problem is sanitation. In both needle injection and conventional nozzle injection types of apparatus, the injection apparatus must press directly against the cut of meat involved. Any impurities that are picked up on one cut of meat are, therefore, transmitted to the next cut of meat. As a result, bacteria or other impurities that may exist at any point in the processing can be distributed throughout the entire injection processes and the meat processed can easily become contaminated.

Another primary problem in the use of an injectate in meat, particularly red meat, is that the oil or water injectate readily cooks out when the meat is cooked or processed further. This results in a large amount of liquid loss and shrinkage in the meat. In addition, it is found in taste tests that meat that has been injected actually tastes drier following cooking than similar cuts of meat that have never been injected. The consumer may actually find that the desirability of a cut of meat has been reduced as a result of the injection process.

A related matter which has had significant impact in the marketplace, and which is expected to have even greater impact in the future, is a concern over the health implications of consuming meats, particularly red meats. The American Heart Association has issued "Dietary Guidelines for Health Adult Americans" dated Aug. 19, 1986. In those dietary guidelines, the American Heart Association clearly set forth some of the perceived dangers in consuming large quantities of meats (particularly red meats).

The American Heart Association pointed out that Americans are consuming excessive quantities of saturated fats. Much of these saturated fats are in the form of animal fats consumed in meats. Having linked the consumption of large quantities of animal fat with heart disease, the American Heart Association's report states that excess meat consumption usually results in the supply of an undesirably large amount of saturated fat. The American Heart Association goes on to recommend that the consumption of carbohydrates be increased, with emphasis on vegetables, fruits, and grain sources, while the intake of saturated fat, particularly in the form of animal fat, be significantly decreased.

It is interesting to note, however, that the dietary guidelines pointed out that the consumption of unsaturated fats, particularly monounsaturated fats, appears to have no adverse health impacts. The Dietary Guidelines state in particular that "monounsaturated and polyunsaturated fats are equally rich in calories but have no definite undesirable effects on serum cholesterol." As a result, the guidelines placed no specific limits on the recommended intake of monounsaturated fats within the confines of the total desirable fat intake. The guidelines further pointed out that these fats may be obtained from vegetable sources, as opposed to meat sources.

It is apparent from the American Heart Association's dietary guidelines that there are new health inducements for decreasing consumption of meats. These health concerns over the consumption of meat tend to further compound the already existing economic problems of the meat production industry which has seen a general reduction of demand for red meat products.

What is currently needed in the art, therefore, are methods, compositions, and apparatus for producing meats which have reduced saturated fat contents, but at the same time are tender, juicy, and desirable consumer products. It would be a further advancement in the art if relatively low grades of red meats could be upgraded effectively and inexpensively to allow for more economic meat production.

It would be another advancement in the art if methods, compositions, and apparatus could be provided which could inject an effective injectate into meat which left the meat juicy and tender even after cooking. It would also be an advancement in the art to provide injection methods and apparatus which are sanitary and which pose no potential health hazards. Similarly, it would be an advancement in the art to economically upgrade meats with an effective injectate which also met the health concerns raised by the American Heart Association guidelines.

It would be another advancement in the art to provide such methods, compositions, and apparatus which provide mechanical tenderization and which also provide the capability of controlling the level of mechanical tenderization.

Such methods, compositions, and apparatus are disclosed and claimed herein.

BRIEF SUMMARY AND OBJECTS OF THE INVENTION

The present invention relates to methods, compositions, and apparatus for upgrading the sensory qualities of red meats. Employing the present invention, relatively low grade red meats can be significantly upgraded to provide desirable and valuable commercial products. The present invention provides a mechanism whereby low grades of beef, such as those that are extremely low in fats and which are tough and dry when cooked, may be made tender, flavorful, and juicy without significantly increasing saturated fat content. The resulting product is a meat having much less saturated fat than conventional high grade beef products which, at the same time, has good taste characteristics and is tender and juicy when cooked.

The present invention also discloses the injection of relatively lean, but low grade, beef products with unsaturated vegetable fat combined with other components as may be desired. The other components which may be included within the injectate include binders and possibly flavorings of various sorts.

One major problem in the prior art has been that injectate is rapidly cooked out of injected meats. The resulting product tastes even drier than non-injected meat. In order to overcome this problem, the present invention teaches combining a binder with the injectate such that the injectate is sufficiently bound within the meat product to leave a juicy and tender meat dish after cooking.

The present invention also teaches the use of nozzles to inject the injectate, which nozzles do not contact the meat during the injection process. According to the present invention, the nozzles are disposed a predetermined distance above and/or below the meat product during the injection process. This provides for increased sanitation and a reduced chance of transmitting impurities or contaminants into the meat from the injection apparatus. The method also provides very significant mechanical tenderization.

One of the benefits of spacing the nozzles from the meat is that when the injectate reaches the meat, it has a greater tendency to follow the natural grains contained within the meat. Using this technique, the injectate has a tendency to follow the natural arrangement of connective tissue within the meat as it is injected. Thus, the present invention can provide a cut of meat which looks as if it is naturally marbled, when in fact, the marbling may consist to a large degree of injected unsaturated vegetable fat.

Within the scope of the present invention, a nozzle injection apparatus is disclosed. The nozzle injection apparatus causes the injectate to travel from a reservoir under pressure through a valve and out of a nozzle. Sufficient pressure must be provided such that the injectate can travel completely through the cut of meat, if desired. At the same time, temperature controls must be provided so that the injectate leaves the nozzle at a temperature within a desired temperature range. In the event the injectate is too warm, the injectate may cook the meat leaving the meat with a brown appearance. If the injectate is too cold, the fats contained within the injectate may solidify and clog the injection apparatus.

As will be set forth in more detail below, meat injected using the injectate and apparatus of the present invention has been found to be extremely desirable. Indeed, poor qualities of meat have been upgraded to the point where taste panels have judged them to be superior to much higher grades of meats. It will be appreciated that the present invention provides an economical method for upgrading low grade meat products. Hence, the present invention gives the meat producer the ability to provide a healthier product and to overcome some of the serious economic problems that are otherwise faced in the red meat production industry.

It is, therefore, an object of the present invention to provide methods, compositions, and apparatus for economically upgrading low grade red meats to a better tasting and tender meat product.

It is a further object of the present invention to upgrade low grade red meats such that the saturated fat content is less than that of conventional high grade red meats.

It is another object of the present invention to provide an injectate which can be injected into meats such that the meats are tender and juicy upon cooking.

It is still another object of the present invention to provide injection methods and apparatus which are sanitary in their operation.

It is also an object of the present invention to provide methods, apparatus, and compositions for obtaining a healthier red meat product.

These and other objects of the present invention will become apparent upon reading the following detailed description and appended claims, and upon reference to the accompanying drawings.

DETAILED DESCRIPTION OF THE PREFERRED EMBODIMENTS

Figure 1:
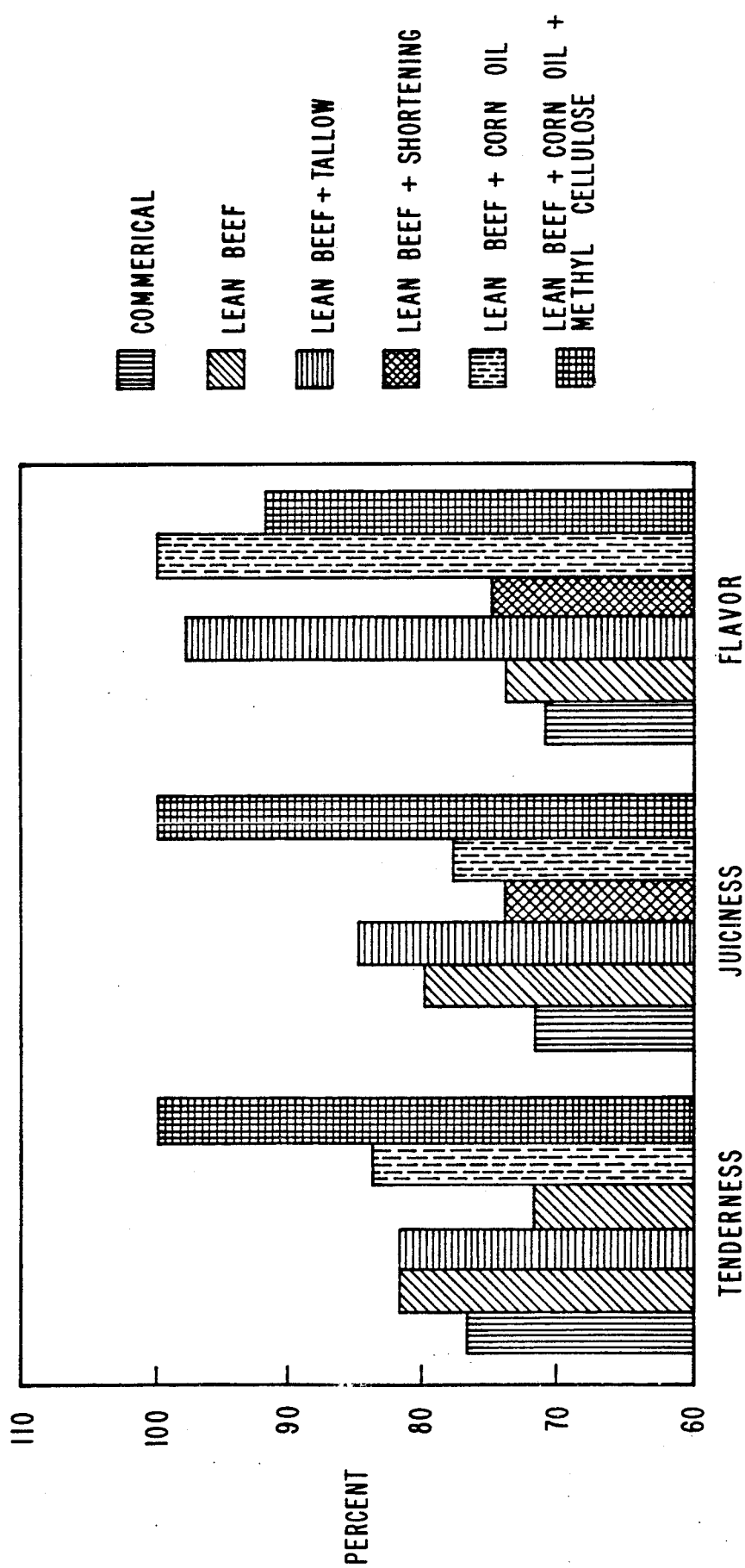
FIG. 1 is a graph presenting data regarding sensor perception of tenderness, juiciness, and flavor for six red meat samples.

The present invention relates to methods, apparatus, and compositions for injecting red meats with certain compositions in order to upgrade the sensory qualities those meats to the consumer. The present invention is particularly adaptable for use in upgrading relatively low grades of fresh red meat. Thus, a low-grade, tough, and undesirable cut of meat can be upgraded so that its sensory, taste and appearance characteristics are quite similar to that of expensive high-grade red meat cuts which have a higher saturated fat content.

I. Injection of Unsaturated Fats with Binder.

In one embodiment of the present invention, tough low-fat cuts of meat are injected with unsaturated fats. Unsaturated fats are used because they do not have the undesirable effects on health as do the saturated fats present in red meats. A readily available source of satisfactory unsaturated fats include vegetable oils, such as corn oil, soybean oil, safflower oil, cottonseed oil, sunflower oil, and peanut oil, and other oils such as olive oil and partially hydrogenated oils. These fats preferably will be added such that they make up about 0.5% to about 5.0% of the total product. By the addition of such unsaturated fats, a low fat cut of meat can be treated so that it tastes similar to cuts of meat which contain more fat.

Flavorings can also be added if desired. It has been found that flavorings such as bouillon, MSG, and meat flavor extracts, both synthetic and natural, enhance the flavor of red meat products. Flavorings can be added to the meat such that they make up from about 0.05% to about 4.0% of the total injectate and from about 0.005% to about 0.4% of the total meat product.

It will be appreciated that the fat added to the low-grade meat may also be an animal fat. While there are the health considerations for not adding saturated fats from animals, taste characteristics may sometimes dictate the use of such fats. In addition, it may be desirable to add such animal fats in order to enhance the appearance of the uncooked product or to enhance the economy of the process.

The present invention discloses the use of a binder in order to maintain the injectate within the meat after the meat is cooked. It is conventionally found that injecting red meat with injectates has had either no effect, or a detrimental effect, on the taste characteristics of the meat after it is cooked. This is caused by the drying effect of the injectate being cooked from the meat. For this reason, the present invention teaches the use of a binder which holds the injectate within the meat. When such a binder is employed, characteristics of tenderness, juiciness, and taste can be increased even after cooking.

Numerous binders are available for use in the present invention, including hydrocolloids, starch gels, pectin gels, gelatin gels, phosphate salts, and other salts.

In experimental test runs using the present invention, methyl cellulose has been found to work well as a binder. In addition, methyl cellulose is approved for use by the Food and Drug Administration up to a concentration of 0.15% of the total product weight. The use of methyl cellulose may avoid regulatory problems which would otherwise be encountered using certain other types of binders.

Preferred ranges of methyl cellulose in the meat is from 0.1% to about 2.5% of the total injectate and from about 0.005% to about 0.15% of the total meat product.

II. Injection Apparatus.

Figure 9:
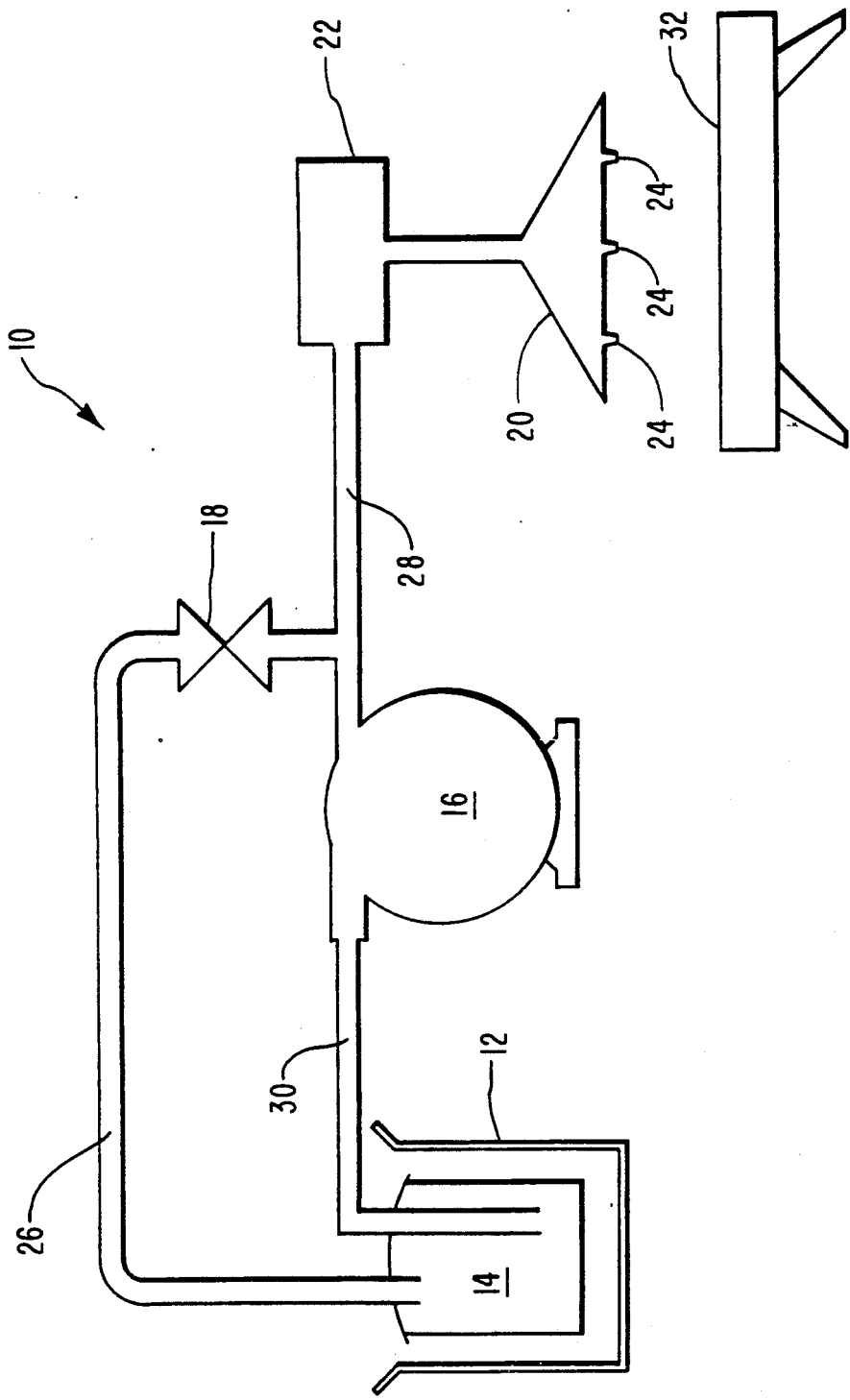
FIG. 9 is an illustration of an apparatus within the scope of the present invention.

In order to properly facilitate injection, a novel injection apparatus has been developed for use in the process of the present invention. The apparatus is illustrated in FIG. 9 and is generally designated 10. The injection apparatus 10 will, in most cases, include a temperature control feature, such as a water bath 12, for controlling the temperature of the fluid to be injected ("injectate"). The actual injectate fluid will be contained within reservoir 14 disposed within the confines of water bath 12. It is crucial that the temperature be controlled within certain ranges in order to provide for proper injection. For use with the unsaturated fats and binders described above, the injectate will preferably keep in the range of from about 0° C. to about 55° C. For one mixture of tallow, flavorings, and binders, the preferred temperature range is from about 35° C. to about 55° C.

In the event that the injectate is too warm, the injectate can partially cook the red meat product. While a cooked meat product may be desirable in certain circumstances, it is anticipated that for most applications of the present invention, it will be desirable not to have a cooked meat product. If the meat has been partially cooked, it will develop a brown appearance which may be undesirable for commercial consumer uses. In addition, if the injectate is too hot, it may not bind to the meat so that the meat product will retain its juicy and flavorable taste after cooking.

If the temperature of the injectate is too low, fouling of the internal apparatus may occur. Since the will typically include a fat, partial solidification of the fat and thus plugging of the apparatus will occur if the injectate is at too low of a temperature.

The apparatus of the present invention also includes a pump 16 and an adjustable relief valve 18 or pressure control assembly. Thus, the injectate can be pumped in a controlled manner from the reservoir through a nozzle assembly 20.

Also useful in the present apparatus is an electric solenoid valve 22, which may be placed in communication with an adjustable timer to control duration of the bursts of injectate. Thus, the volume of injectate can be carefully controlled as can the amount of injectate which leaves the system. This apparatus can then be connected to a starter and relay to operate the valve 22.

The injection apparatus will include a nozzle assembly 20. The nozzle assembly will function to direct the injectate in the proper direction and to maintain the stream of injectate at the proper volume. The nozzle assembly 20 may include a plurality of individual nozzles 24.

The various components of the apparatus are placed in fluid communication by lines including recycle line 26, a feed line 28, and reservoir line 30.

Finally, the apparatus illustrated in FIG. 9 includes an injection table 32 to provide support for the meat being injected.

In one experimental embodiment of the apparatus of the present invention, a Blue M water bath, manufactured by Magic Whirl was obtained. This water bath was placed in communication with a Crepaco, Multi-Flow 3DDL pump which was rated to 10,000 psi. In addition, a Crepaco, SPB solid valve and an atkomatic type SLSTW solenoid valve (size ⅜) were used. The timer was manufactured by Omron, H3CA and the starter was an Automatic Valve Company, catalog No. R611. Finally, nozzles were obtained from A. I. Gatti Company and were 0.004–0.025 inch in diameter sapphire nozzles. It will be appreciated that these components simply represent an exemplary embodiment of one type of injection apparatus and that the components may be substituted for other components which perform a similar function.

The apparatus of the present invention overcomes many of the problems encountered in the existing art. For example, the present invention is sanitary in operation since the nozzles do not directly contact the meat being injected. Thus there is a greatly reduced risk of contamination of the product.

The present invention also is capable of providing mechanical tenderization of the meat without touching the meat. It is found that the injectate stream itself can provide mechanical tenderization by separating and cutting internal connective tissues. Thus, the same results as those accomplished by blade insertion can be accomplished without the disadvantages of the blade systems.

III. Methodology of the Present Invention.

A series of experiments were run wherein red meat was injected with various types of injectate and then tests were performed on the resulting meat product. The tests performed included both mechanical sheer tests and subjective taste tests. The tests performed measured various characteristics of the product including tenderness, juiciness, flavor, lipid content, and overall consumer acceptability.

In a typical run, the injectate was heated in a water bath; the water bath was kept at a temperature of from about 110° F. to about 160° F. to keep the injectate within an acceptable temperature range. The pump was initiated and a relief valve set to provide the desired pressure. The injectate was then pumped through the relief valve for a few minutes to ensure that the system had attained a steady state and that all rinse water contained within the system had been purged. When the system had been purged and pressure equilibrated, the injection apparatus was turned on and the timer set to the burst duration which was desired.

Meat was placed at varying distances (from as close as 0.1 inch to as far as 10 inches) below the nozzles. Streams of liquid injectate were emitted from the nozzles at high velocity, with bursts lasting 0.1 to 10 seconds. The liquid was pressurized to from about 200 pounds per square inch ("psi") to about 8,500 psi. Thus, a high velocity injectate stream was obtained.

The meat used in the various experiments ranged in thickness from 0.75 inches to six inches and was injected at multiple sites. The distance between injection sites was variable in order to achieve particular tenderization, moisture, and fat percentage characteristics.

The injectate, comprised of various oils, water, and binders, was generally maintained at below 120° F. in order to avoid precooking of the meat. In order to inject tallow or other materials such as partially hydrogenated vegetable oil, however, it was generally desirable to maintain the injectate at above 122° F. in order to prevent solidification of the tallow and resultant clogging of the equipment. Specifically, tallow solidifies at about 104° F. Using alternative embodiments of the injection apparatus such as pumps and valves for higher viscosity liquid such as those known in the hydraulics industry, it is possible to inject higher viscosity liquid at lower temperatures to further assure against cooking the meat.

It was found in several experimental runs that to inject through four to six inches of tough bottom-round beef, pressures of 6,000 psi and up in bursts of up to five seconds were necessary. It was also found that there is a correlation between injection pressure and retention of injectate in the meat.

Moderate (4,000 to 6,000 psi) pressure injection of a relatively thin (one inch) piece of meat will generally cause a lower retention of injectate than when using lower pressure (1,000 to 2,000 psi). It was found best to avoid using pressures and burst durations that cause injectate to pass completely through the meat sample for the majority of the injection period in order to minimize the amount of wasted injectate and to maximize the amount of injectate retained in the meat.

Good mechanical tenderization is also observed when injectate is injected in bursts of from about 0.5 seconds to about 5 seconds, and at pressures from about 1000 psi to about 8000 psi. Actual upper desirable pressure limits are thought to be even higher than those obtained during the test runs.

IV. Exemplary Test Runs, Data, and Analysis.

Initially, low-grade beef steaks (0.75 to 1.5 inches thick) were injected with tallow (saturated beef fat). A summary of this injection procedure is set forth in Table below indicating grade and type of steak, and moisture and fat content before and after injection, and moisture and fat content before and after cooking. Table 1 sets forth the moisture content as a percentage of weight and lipid content (as a percentage of dry weight and as a percentage of wet weight). As can be seen from Table 1 (which is representative of results of multiple experiments), the present invention provides the ability to inject tallow to concentrations virtually as high as would be desired.

TABLE 1

SELECTED DATA REPRESENTATIVE OF INITIAL MEAT INJECTION EXPERIMENTS, SHOWING MOISTURE AND LIPID BEFORE (A) (C) AND AFTER INJECTION (B) (D).

| Pressure (psi) | Sample No. | Cut of Meat/ Grade | Moisture (%) | Lipid (% dry wt) | Lipid (% wet nt) |
|---|---|---|---|---|---|
| 300 | 18A | rib eye (grass fed)* | 75.9 | 9.69 | 2.34 |
| | 18B | | 73.2 | 15.47 | 4.14 |
| | 18C | | | | |
| | 18D | | | | |
| 500 | 16A | rib eye (grass fed)* | 71.8 | 17.13 | 4.83 |
| | 16B | | 70.2 | 32.02 | 9.54 |
| | 16C | | 65.8 | 16.56 | 5.66 |
| | 16D | | 63.1 | 20.30 | 7.50 |
| 500 | 20A | rib eye (grass fed)* | 75.6 | 8.06 | 1.97 |
| | 20B | | 64.9 | 35.44 | 12.44 |
| | 20C | | | | |
| | 20D | | | | |
| 600 | 8A | round (choice) | 70.5 | 19.6 | 5.8 |
| | 8B | | 63.2 | 43.5 | 16.0 |
| | 8C | | 60.9 | 14.4 | 5.8 |
| | 8D | | 54.6 | 20.6 | 9.3 |
| 700 | 19A | rib eye (grass fed)* | 75.9 | 9.43 | 2.27 |
| | 19B | | 63.3 | 42.52 | 15.6 |
| | 19C | | | | |
| | 19D | | | | |
| 1000 | 3A | round (choice) | 74.2 | 6.17 | 1.59 |
| | 3B | | 70.5 | 21.12 | 6.23 |
| 1500 | 11A | round (choice) | 73.1 | 13.0 | 3.5 |
| | 11B | | 55.7 | 54.3 | 24.1 |
| | 11C | | 63.3 | 20.8 | 7.6 |
| | 11D | | 60.1 | 25.3 | 10.1 |
| 1500 | 13A | round* | 69.1 | 25.03 | 7.73 |
| | 13B | | 60.1 | 41.37 | 16.51 |
| | 13C | | 59.8 | 28.84 | 11.59 |
| | 13D | | 53.8 | 30.93 | 14.29 |
| 1500 | 14A | round* | 71.2 | 12.73 | 3.67 |
| | 14B | | 56.8 | 52.61 | 22.73 |
| | 14C | | 64.3 | 22.65 | 8.09 |
| | 14D | | 53.5 | 39.84 | 18.52 |
| 1500 | 15A | bottom round | 67 | 27.8 | 9.2 |
| | 15B | | 54.9 | 52.6 | 23.7 |
| | 15C | | 57.3 | 29.5 | 12.6 |
| | 15D | | 56.5 | 26.0 | 11.3 |
| 2000 | 12A | round (choice) | 72.6 | 15.6 | 4.2 |
| | 12B | | 69.3 | 25.4 | 7.8 |
| | 12C | | 64.8 | 16.65 | 5.86 |
| | 12D | | 64.3 | 15.00 | 5.35 |
| 2300 | 10A | round (choice) | 73.4 | 10.3 | 2.74 |
| | 10B | | 66.7 | 31.49 | 10.49 |
| | 10C | | 59.6 | 24.05 | 9.72 |
| | 10D | | 60.7 | 18.28 | 7.18 |
| 2500 | 7A | round (choice) | 74.9 | 7.0 (8.5,5.4) | 1.8 (2.1,1.4) |
| | 7B | | 70.2 | 23.3 (22.8,23.8) | 7.0 (6.8,7.1) |
| | 7C | | 60.7 | 11.5 (12.0,11.1) | 4.6 (4.7,4.4) |
| | 7D | | 55.4 | 22.3 (22.6,22.1) | 10.0 (10.1,9.8) |
| 2500 | 9A | | 71.4 | 18.50 | 5.29 |
| | 9B | round (choice) | 60.3 | 46.05 | 18.28 |
| | 9C | | 67.7 | 8.57 | 2.77 |
| | 9D | | 63.3 | 20.41 | 7.49 |

Key to Sample No.:
A - raw, untreated
B - raw, injected
C - cooked, untreated
D - cooked, injected
*These samples were "no roll," indicating that the animal was not graded. "No roll" is an industrial term often used for animal carcasses that fall short of choice due to lack of marbling and finishing fat.

No roll is described further as non-graded beef. Choice, conversely, is described as meat graded "choice" under USDA standards. No roll was included because it would generally be expected to be perceived as tough and dry. Choice was included because it would generally be expected to be perceived as tender and juicy.

Table 2 below summarizes data concerning subjective perception of tenderness and juiciness of tallow injected beef steak indicating the injection pressure for each sample.

TABLE 2

Sensory panel results for tallow injected and uninjected beef steak.
Average Score Difference

| Meat Number | Injection Pressure | Tenderness | Juiciness |
|---|---|---|---|
| 18 | 300 (psi) | 0 | −1 |
| 19 | 700 | +1.75 | +.25 |
| 20 | 500 | +.5 | −1 |
| 21 | 800 | +1.75 | +.25 |
| 27 | 1000 | +1.75 | +.25 |
| 28 | 1100 | −1.75 | 0 |
| 29 | 1500 | −1 | 0 |
| 30 | 500 | −1 | −1 |
| 35 | 900 | +1.5 | −.25 |
| 32 | 800 | −1.5 | −1.75 |
| 33 | 1800 | +1.25 | 0 |
| 34 | 2000 | −.5 | 0 |
| 36 | 200 | +2.75 | −.50 |
| 37 | 1300 | −.25 | −.25 |
| 40 | 1700 | 0 | 0 |
| 41 | 3200 | +.25 | 0 |
| 42 | 2700 | +1 | +.25 |
| 43 | 400 | +.5 | −.5 |
| 47 | 600 | +.5 | 0 |
| CUMULATIVE SCORE | | +11 | −5.25 |

Key: Greatest possible difference is 8. A positive score means the injected meat was judged more tender or juicy than the untreated.

As indicated in Table 2, even with the injection of tallow, there was no marked increase in the perception of juiciness of the beef steak as shown by the overall negative cumulative score. Indeed, the perception of juiciness declined. It should be noted that there was a perceived increase in tenderness. It is believed that the increase in perceived tenderness was due to the physical effects of the injectate penetrating the beef steak.

Objective tenderness analyses (Warner-Bratzler Shear Test) substantiated that the meat was indeed mechanically tenderized by an average of nearly 22%. The Warner-Bratzler Shear Test is described in Bratzler, "Proc. Second Ann. Reciprocal Meat Conf.," Nat'l Livestock Meat Board and Schultz, "Proc. Tenth Ann. Reciprocal Meat Conf.," Nat'l Livestock Meat Board (1957). In performing these tests, a one-half inch core of the cooked meat sample was extracted and the shear pressure was determined using the Warner-Bratzler method. The mechanical tenderization data obtained using the Warner-Bratzler Shear Test is summarized in Table 3 below.

TABLE 3

RESULTS OF WARNER-BRATZLER TEST FOR 20 STEAKS REPRESENTATIVE OF THE SAMPLES SHOWN IN TABLE 2.

| Steak # | Untreated Sample Force Required to Shear Through Core (lbs) | Injected Sample Force Required to Shear Through Core (lbs) |
|---|---|---|
| 18 | 1.9 | 4.4 |
| 19 | 3.9 | 2.0 |
| 20 | 5.0 | 3.8 |
| 21 | 3.4 | 2.5 |
| 27 | 3.1 | 5.1 |
| 28 | 5.6 | 5.3 |
| 29 | 7.4 | 7.4 |
| 30 | 6.1 | 3.9 |

TABLE 3-continued
RESULTS OF WARNER-BRATZLER TEST FOR 20 STEAKS REPRESENTATIVE OF THE SAMPLES SHOWN IN TABLE 2.

| Steak # | Untreated Sample Force Required to Shear Through Core (lbs) | Injected Sample Force Required to Shear Through Core (lbs) |
|---|---|---|
| 31 | N/A | N/A |
| 32 | 6.9 | 1.5 |
| 33 | 2.9 | 5.1 |
| 34 | 5.0 | 3.4 |
| 36 | 8.9 | 4.4 |
| 37 | 10.8 | 4.3 |
| 41 | 4.3 | 4.5 |
| 42 | 7.8 | 3.8 |
| 43 | 8.0 | 3.3 |
| 47 | 4.5 | 5.0 |
| 48 | 4.3 | 3.5 |
| 49 | 4.5 | 7.5 |
|  | 105.3 | 86.1 |

(X to Y) = 21.6%

It is believed that the taste panel data summarized in Table 2 shows a lack of perception of the magnitude of increased tenderness which is indicated by the objective tenderness test because the injected meat was not perceived to be juicy. Generally, in taste tests, it has been found that juiciness and tenderness are positively correlated in meat judging. Juiciness, or the presence of oil, provides a lubricant making it easier to bite through food.

Additional experiments were done by injecting the injectate stream diagonally or perpendicularly to the meat grain. An additional technique was developed whereby the meat was moved a small predetermined distance during injection. Using this moving technique, the red meat was injected perpendicularly or diagonally with the grain and moved about 0.2 inches relative to the nozzle during the burst of injectate. Warner-Bratzler Tests of meat injected at an angle greater than 45° with the grain and pulled approximately 0.2 inches indicated a high degree of mechanical tenderization. These results are summarized in Table 4 below.

TABLE 4
AVERAGED RESULTS OF SENSORY PANEL (N = 6) AND WARNER-BRATZLER TEST FOR WATER INJECTED STEAKS. STEAKS WERE INJECTED DIAGONALLY WITH THE MEAT GRAIN AT A PRESSURE OF 6000 PSI TO CREATE HOLES OR SLOTS.

| Steaks | Sensory Juicy | Sensory Tender | Sensory Flavor | Warner-Bratzler Test (lbs) |
|---|---|---|---|---|
| Hole injected[a] | 4.8 | 3.6 | 4.8 | 2.75 |
| Slits[b] | 4.3 | 5.2 | 4.5 | 1.00 |
| Untreated (control) | 5.1 | 4.5 | 5.3 | 5.6 |

Key: The sensory scale is 0-9, with 9 being the juiciest, tenderest and most flavorful. The higher score is the least desirable for the Warner-Bratzler test because it indicates force needed to shear through cores taken from the meat.
[a]Meat was held stationary relative to the nozzle during injection bursts.
[b]Meat was moved relative to the nozzle during injection bursts.

Table 4 is the average results of injecting bottom round steaks with water only. The hole-injected steaks were injected 0.2 inches apart. The slit-injected steaks were moved about 0.2 inches during a one to two-second burst and were injected 0.2 inches between injection slits. Warner-Bratzler Shear tests for the hole-injected and slit-injected steaks was 51% less and 82% less, respectively, than a control. The taste panel judged the shot and pull most tender but least juicy and flavorful.

An important phenomenon of perpendicular or diagonal injection is the distribution of the injectate throughout the meat. The energy of the injectate stream is dissipated along the entire path of the injectate. As a result, part of the injectate stream fans out to follow the meat grain along the entire path of the stream. Injectate is, therefore, relatively uniformly distributed throughout the meat. This procedure results in excellent distribution of oils, water, and flavoring.

In addition, this phenomenon may provide an excellent technique for injecting an enzyme, such as collagenase, which is known to break down connected tissue. Using the present invention to inject collagenase will tend to result in rapid and efficient tenderization since the injectate follows the tough connective tissue throughout the meat. The collagenase is, therefore, located directly adjacent to the tissue on which it acts.

As described above, in order to increase the juiciness and flavor of the injected meat, binders are added to the injectate stream. Such binders may include gel-forming materials and emulsifiers in the amount of from about 0.1% to about 2.5% of the total injectate. Binders may include gums, thickeners, salts, and combinations of the same.

Other components added to the injectate for which data is presented below were corn oil, tallow, and shortening. Each of these components were added to samples of lean ground beef containing approximately 3.5% fat.

Figure 2:
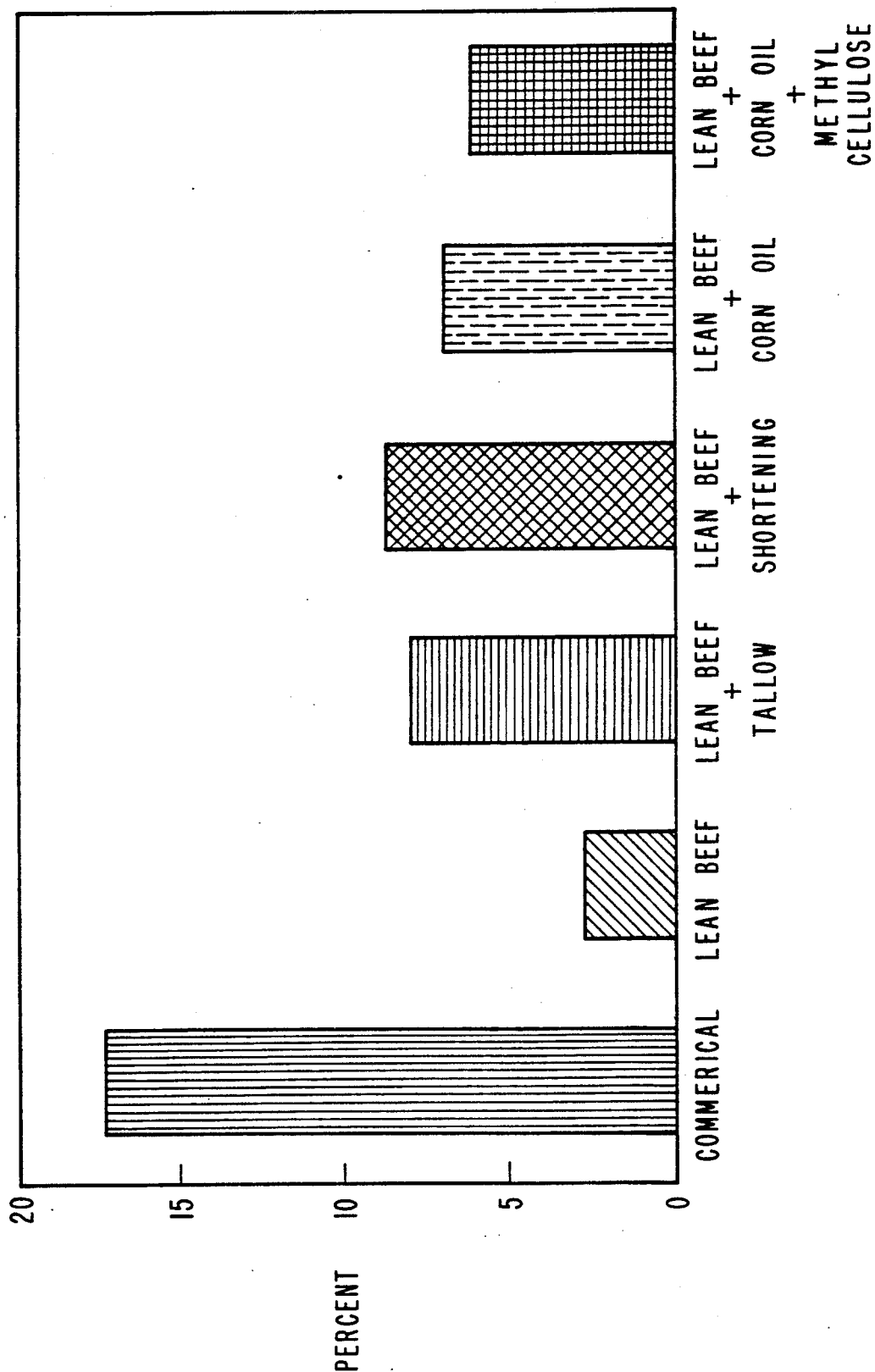
FIG. 2 is a graph presenting data regarding the lipid content of the six red meat samples represented in FIG. 1.

Two sensory panels were employed comprising 21 individuals. The panel sampled broiled, ground mixtures of lean beef and lean beef together with various added injectates. The results obtained from the first panel are set forth in attached FIG. 1 while the lipid content of the various meats sampled is summarized in FIG. 1 are set forth on FIG. 2.

The sample that was judged the most juicy, tender, and ranked high in flavor, contained lean beef, corn oil, and 0.01% methyl cellulose binder. The patty that ranked first in flavor contained lean beef and corn oil. It is significant that this top ranked sample contained less than half of the fat of the so-called lean commercial hamburger, and most of the fat in the preferred sample was polyunsaturated and low in cholesterol. These results clearly indicate that tenderness and juiciness are enhanced by the addition of the binder and that a desirable product having a low saturated fat content can be produced according to the present invention.

In an additional experiment, steaks from the bottom round (very tough) were injected with tallow, tallow plus methyl cellulose, corn oil plus methyl cellulose, and lightly flavored water plus methyl cellulose. The methyl cellulose concentration in the injected meat was between 0.01% and 0.10%, which is below the FDA limit of 0.15% by weight.

The steaks were broiled and presented to a taste panel of 26 individuals. The results of this taste panel are set forth in attached FIG. 3. It was found that the taste panel preferred corn oil and tallow with methyl cellulose over the control or meat injected with tallow only. It is important to note from FIG. 3 that the most preferred steaks were those injected and having a binder included within the injectate. The least preferred steak was that injected with tallow alone.

The reason for the results shown in FIG. 3 can be partially explained with reference to FIG. 4. FIG. 4 clearly points out that injecting tallow alone produced steaks that were perceived dry compared to the steaks injected with an injectate containing a binder. The same was true for steaks injected with water. This is true because the material injected without a binder is not "bound" within the meat and has a tendency to cook out.

Figure 5:
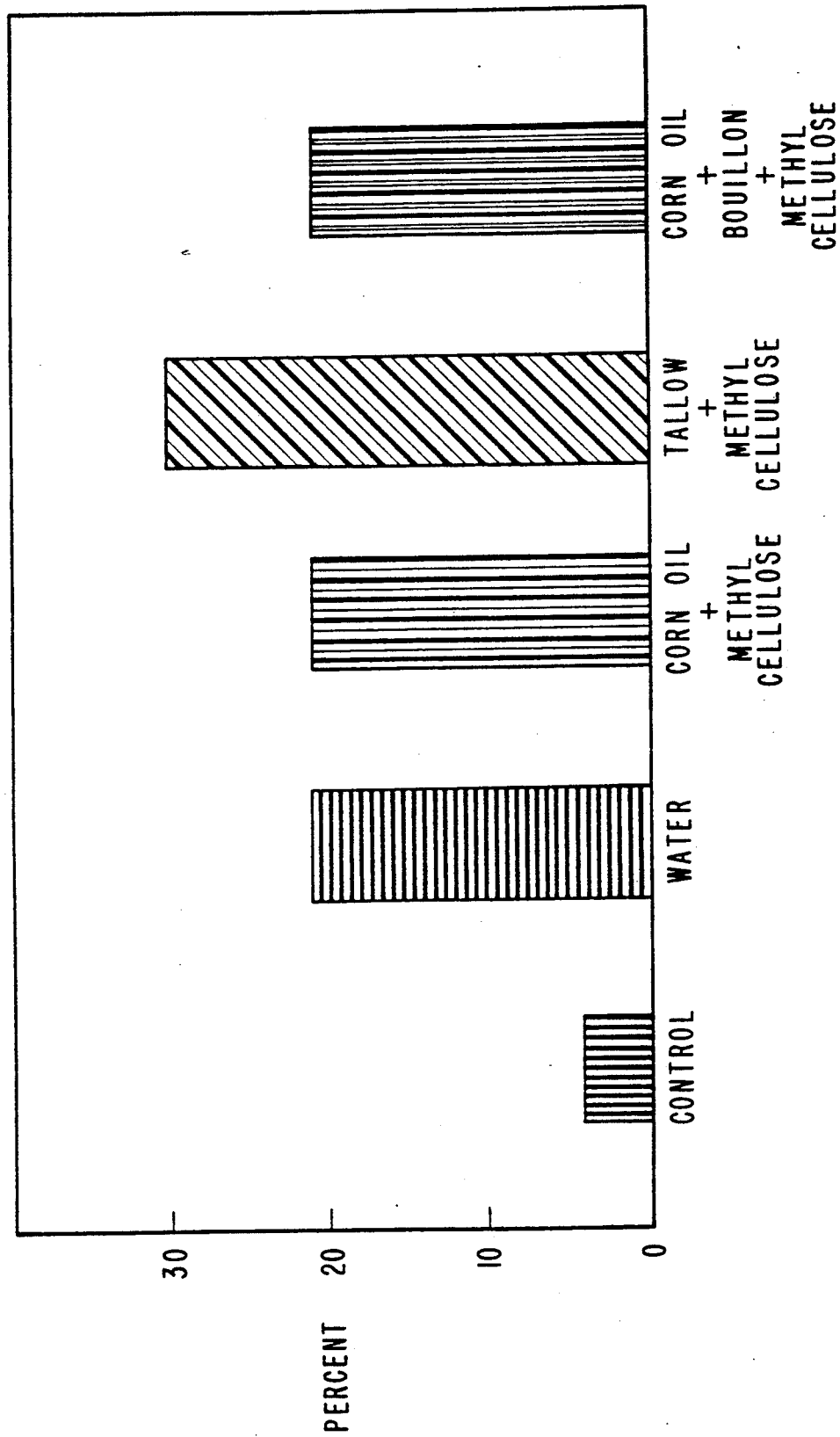
FIG. 5 is a graph presenting data regarding the overall consumer preference for five red meat samples.

As summarized in FIG. 5, the experiment outlined above was repeated by injecting steaks with water, corn oil plus methyl cellulose, tallow plus methyl cellulose, and corn oil plus flavored water and methyl cellulose. In both of the experiments, steaks were injected in a shot and pull fashion as described above, then cut into 0.75 inch thick steaks and broiled rare to medium rare for the taste panel. As shown in FIG. 5, all but one of the 26 panelists preferred the injected meat over the noninjected meat (control). The most preferred steak, by a small margin, was that injected with tallow plus methyl cellulose. However, the other injected steaks also received favorable ratings.

Figure 3:
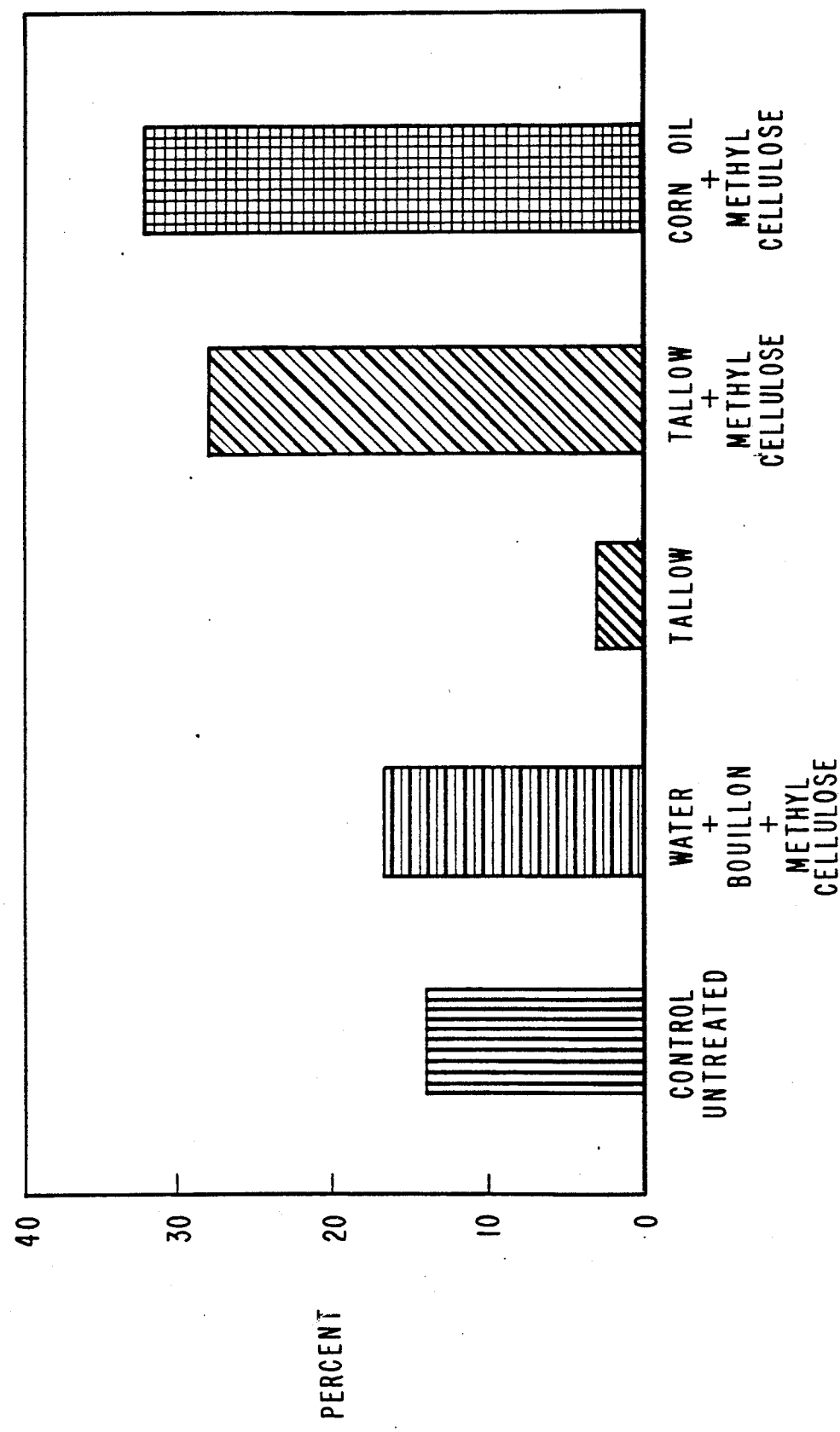
FIG. 3 is a graph presenting data regarding the sensory perception of overall acceptability of five red meat samples.
Figure 4:
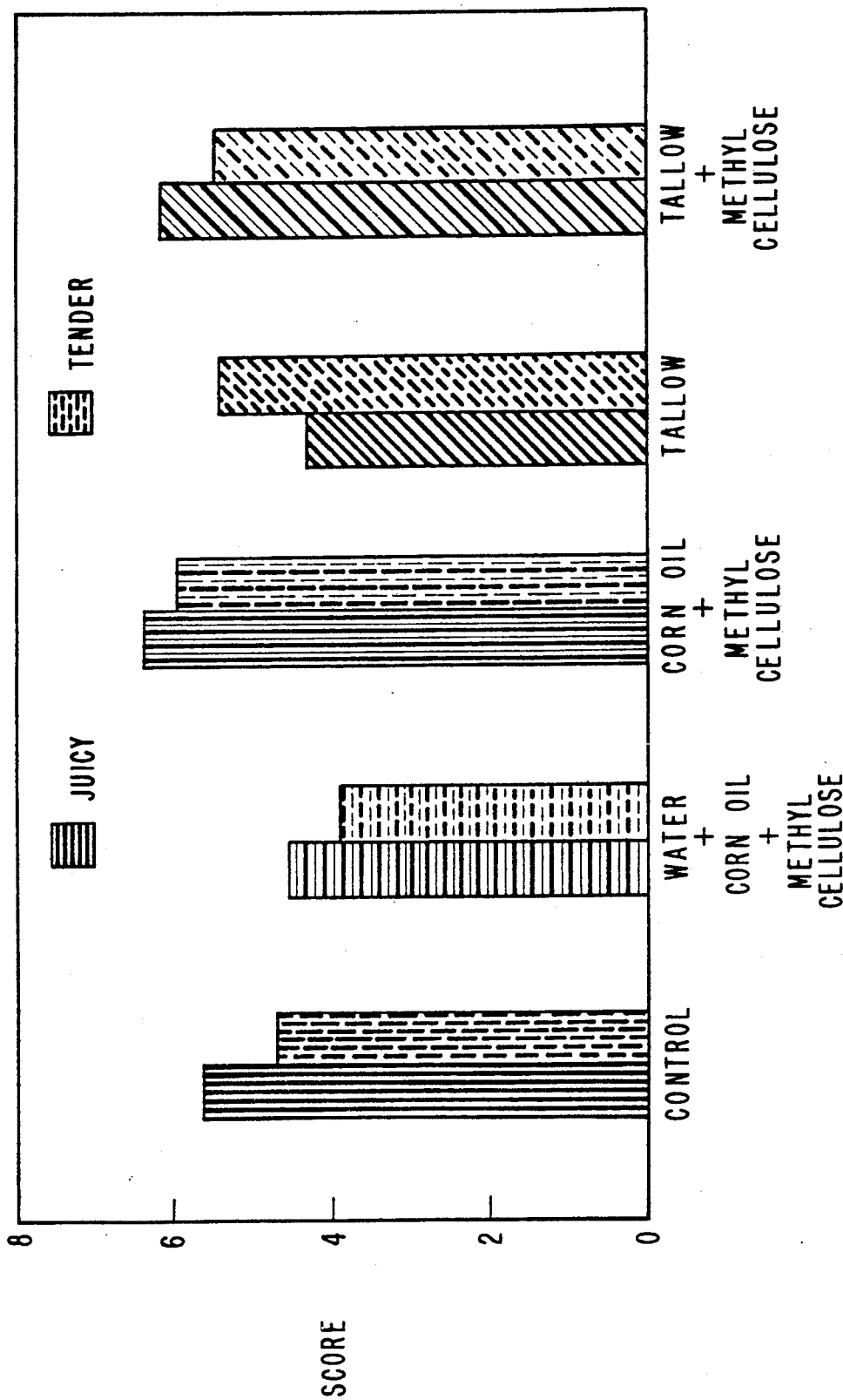
FIG. 4 is a graph presenting data regarding the sensory perception of juiciness and tenderness for five red meat samples.

The results of both taste panels as summarized in FIGS. 3 and 5 were similar. It should be noted that tallow injected without a binder was ranked very low as shown in FIG. 3 which corresponds to the other data presented above. This is believed to be true because cooking resulted in the loss of added fat when a binder is not used.

Figure 6:
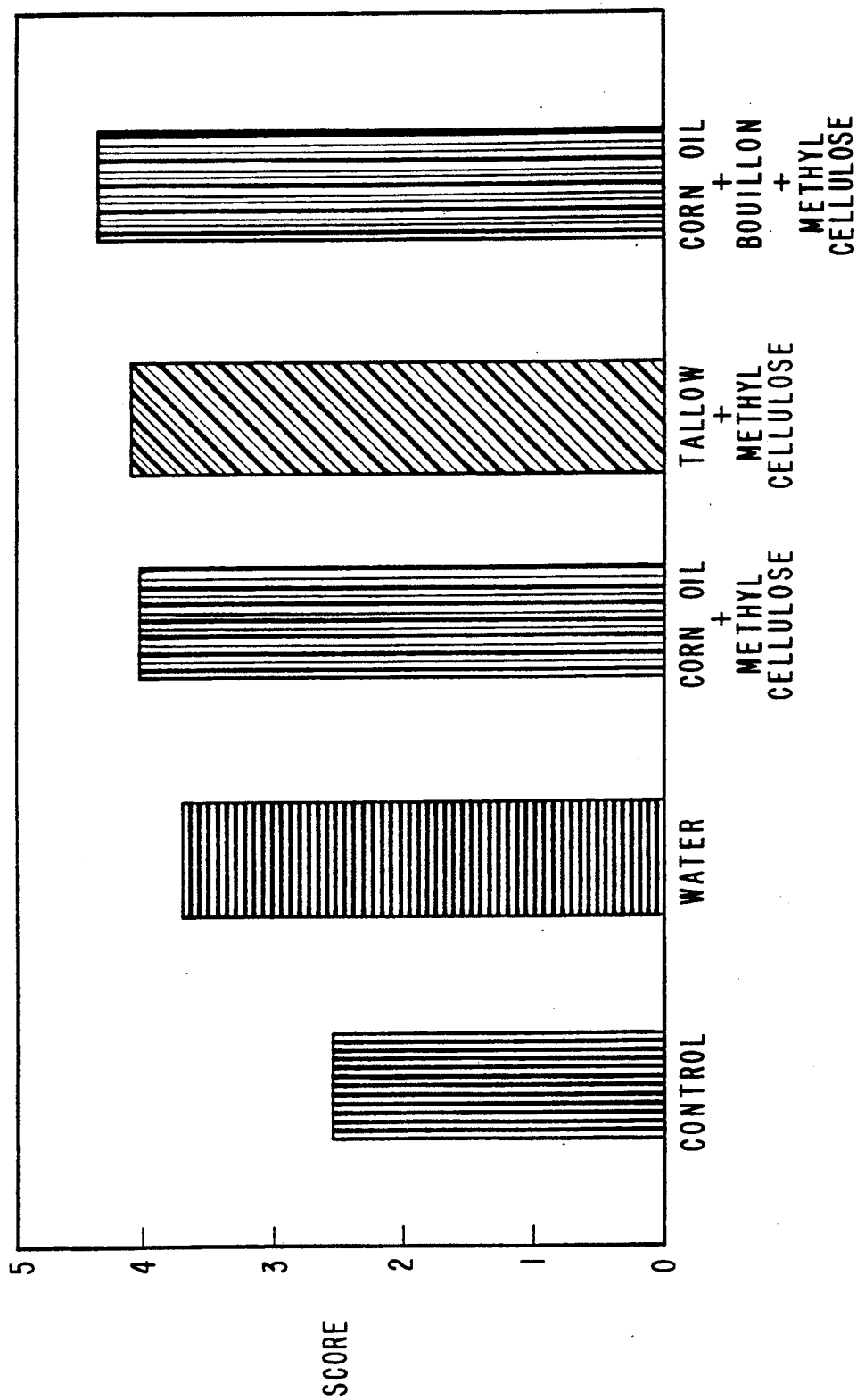
FIG. 6 is a graph presenting data regarding the sensory perception of tenderness for the five red meat samples for which data is presented in FIG. 5.

FIG. 6 indicates the taste panel's evaluation of tenderness for the steaks. The control is judged 2.5 out of a possible 10, or very tough. The steaks judged most tender were all injected steaks. Those steaks were most tender because of the cutting action during injection. Those receiving the highest scores were injected with oil or tallow plus a binder.

Figure 7:
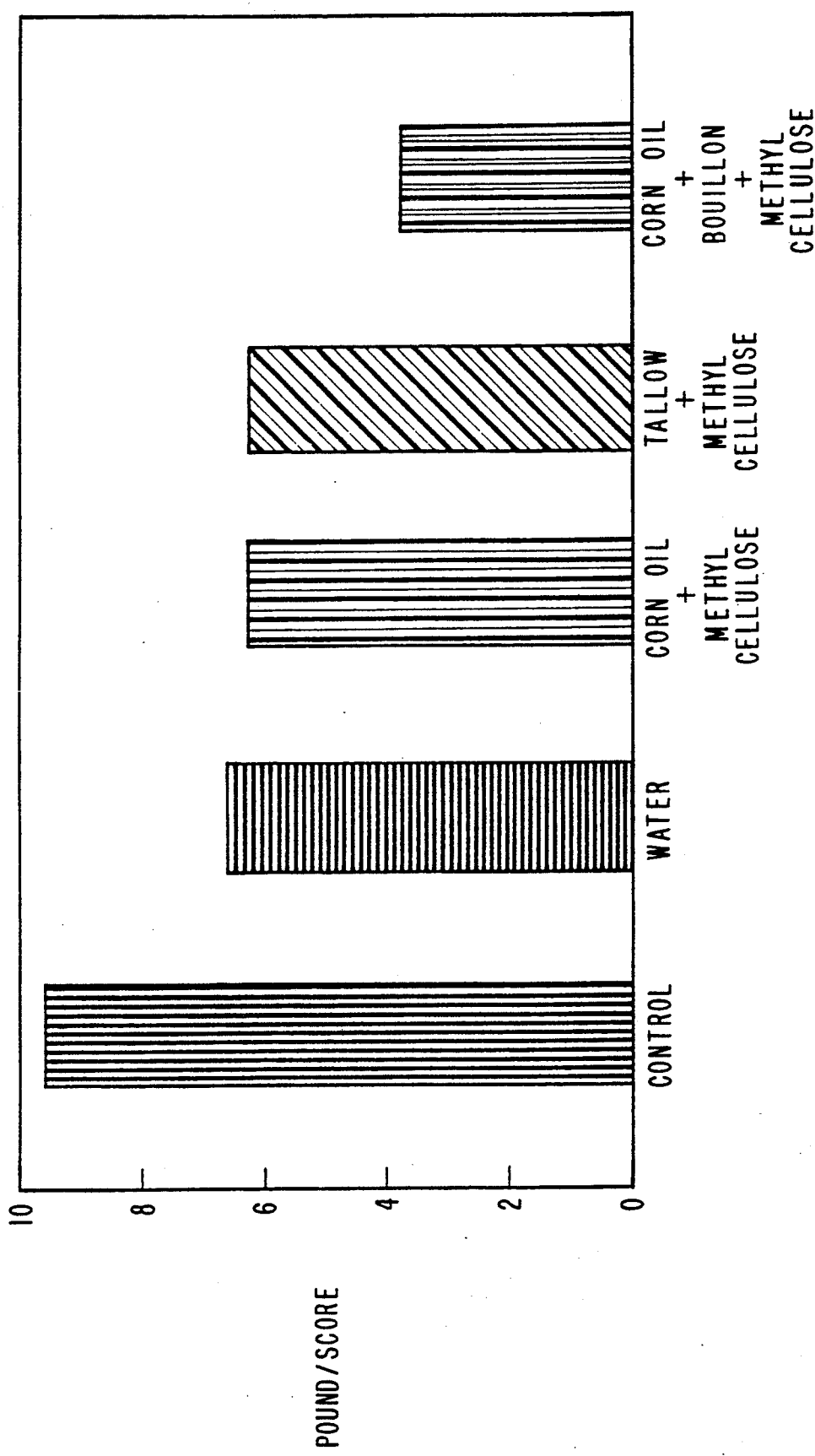
FIG. 7 is a graph presenting tenderness data obtained using objective physical tests on the five red meat samples for which data is presented in FIGS. 5 and 6.

FIG. 7 sets forth the Warner Bratzler shear data for steaks for which data is included within FIGS. 5 and 6. The tenderization effect is obvious and significant. The corn oil, bouillon, and methyl cellulose injected steaks rank significantly more tender than the uninjected control and somewhat more tender than the other injected steaks.

The better score for the corn oil-bouillon-methyl cellulose steak may be due in part to a very small amount of salt injected within the bouillon flavoring. Salt has a known tenderizing effect. This observation helps to show that the injected meat could be made very much more tender by the addition of chemical tenderizing agents. Regardless of salt injection, however, it is clear from FIG. 7 that injection of any type of injectate, including water, provides a significant tenderization effect. Again, this is true because of the cutting action (mechanical tenderization) of the liquid injection.

The data outlined above points out that low-cost polyunsaturated oil, tallow, or water may be added to a low grade, low-cost cut of beef, like bottom round, making the final product comparable to a more expensive steak. This allows the meat to be produced at a low cost and to obtain an attractive price in the market. In addition, the amount of saturated fat within such a steak can be closely controlled and minimized by the addition of vegetable oil or water instead of animal fat. As discussed above, this will have significant health benefits.

Figure 8:
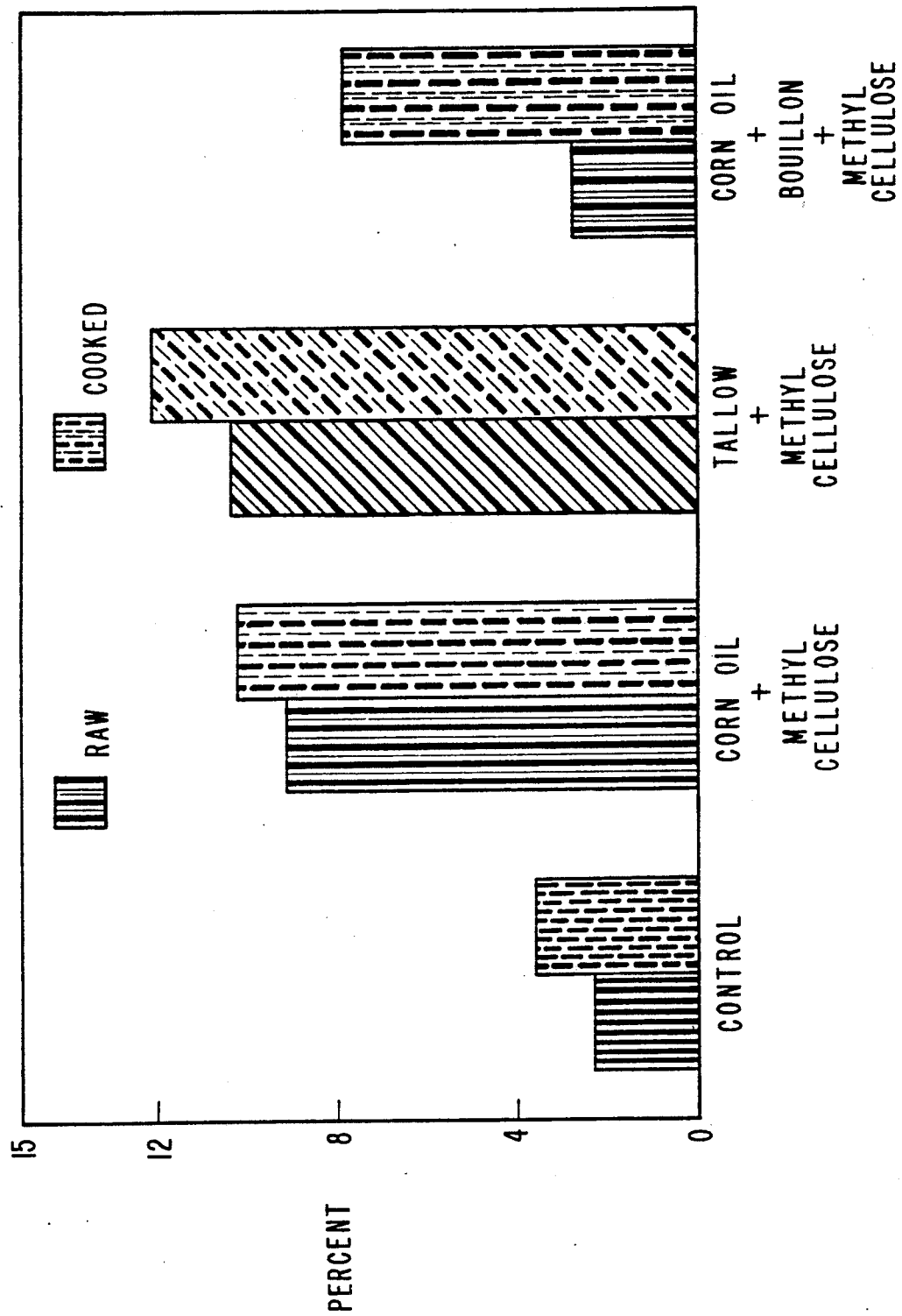
FIG. 8 is a graph illustrating the fat content and loss of fat during cooking for four red meat samples.

FIG. 8 shows the fat content and loss upon cooking of various samples of injected meat, as well as a control. The fat content of the injected steak is less than half that of a typical prime steak. The control shows the lowest weight loss from cooking, but since the weight of the injected steaks had been increased an average of 15%, the net shrink or weight loss was an average of 7% less for injected steak. Net shrink is founded by comparing precooked weight of the injected product or control to the cooked weight of the injected product or control. These results indicate that injected steak containing only moderate amounts of fat tastes good and has the potential of reducing shrinkage compared to comparable cuts of noninjected meat.

Meat appearance can also be improved dramatically by the injection treatment. Injecting low grade lean meat with tallow, shortening, or substances of similar titer that solidify in the meat, gives the lean meat the appearance of natural marbling comparable to that found in prime or choice steak. The color of injection treated meat is generally a brighter reddish pink which also upgrades the meat. It is found in the marketplace that bright color and good marbling generally designates freshness, superior processing, and a higher grade meat.

SUMMARY

It can be seen from the data presented above that the objects outlined have been accomplished by the present invention. In particular the present invention provides the ability to economically upgrade low grades of meat in order to vastly improve their market value. The present invention reduces the need to feed cattle in feed lots in that similar résults can be obtained by injecting meats produced by less expensive methods. This results in an increased ability for the farmer or rancher to operate profitably and to produce a reasonably priced but high quality meat product.

At the same time, the present invention allows meats to be upgraded through the use of unsaturated vegetable fats so that the total saturated fat contained within the meat product is less than prime grades of meat. This ability helps to alleviate some of the concerns as outlined in the American Heart Association Guidelines summarized above. Specifically, saturated fat intake is reduced, thus reducing the potential adverse impacts of high levels of meat in the diet.

The present invention also provides the ability to produce a good tasting meat product. As can be appreciated from the results of the sensory panels outlined above, the injected meat is generally found to be more tender and juicy than is noninjected meat.

Furthermore, the method of injecting provides some significant benefits over the prior art. Injection can be done without contact between the meat and the injection nozzle. This results in less potential contamination and easier operation of the apparatus.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method of treating and upgrading the tenderness and sensory qualities of fresh red meats, the method comprising the steps of:
   a) providing an injection apparatus having at least one nozzle, said nozzle having an orifice through which an injectate can be directed to the meat to be treated;
   b) providing an injectate composition to be injected into the meat, said injectate composition comprising at least oil or fat and at least one binding substance for retaining the fat or oil in the meat;

c) placing the meat to be injected at a predetermined distance from the nozzle such that said meat is in the path of the injectate composition leaving the orifice of the nozzle and such that the injectate composition can be injected into the meat without the nozzle penetrating into the meat;

d) injecting the meat by causing the injectate to flow from the nozzle at a sufficient pressure such that the injectate composition penetrates the meat and at least a portion of the injectate composition penetrates the existing connective tissue within the meat, said injectate composition being injected into the meat so as to cut at least a portion of the connective tissue within the meat in order to mechanically tenderize the meat; and e) moving the meat in relation to the nozzle such that the portion of connective tissue is cut both vertically and longitudinally.

2. A method of treating and upgrading the tenderness and sensory qualities of fresh red meats as defined in claim 1 wherein the meat is moved from about 0.1 to about 0.5 inches during the period that the injectate is being injected into the meat.

3. A method of treating and upgrading the tenderness and sensory qualities of fresh red meats as defined in claim 1 wherein the meat is spaced from the nozzle from about 0.1 inches to about 10 inches during injection.

4. A method of treating and upgrading the tenderness and sensory qualities of fresh red meats as defined in claim 1 wherein the meat is injected with injectate for from about 0.1 to about 10 seconds.

5. A method of treating and upgrading the tenderness and sensory qualities of fresh red meats as defined in claim 1 wherein the injectate is brought to a pressure within the apparatus of from about 200 psi to about 8,500 psi immediately prior to injection.

6. A method of treating and upgrading the tenderness and sensory qualities of fresh red meats as defined in claim 1 wherein the meat is simultaneously injected at a plurality of sites.

7. A method of treating and upgrading the tenderness and sensory qualities of fresh red meats as defined in claim 1 wherein said apparatus comprises a plurality of nozzles spaced a fixed distance from one another.

8. A method of treating and upgrading the tenderness and sensory qualities of fresh red meats as defined in claim 1 wherein the injectate is maintained at a temperature prior to injection which is high enough to prevent solidification of the injectate but low enough that the meat is not cooked by the injectate.

9. A method of treating and upgrading the tenderness and sensory qualities of fresh red meats as defined in claim 1 wherein the injectate is brought to a temperature of between about 122° F. and about 158° F. immediately prior to injection.

10. A method of treating and upgrading the tenderness and sensory qualities of fresh red meats as defined in claim 1 wherein the binder comprises methyl cellulose.

11. A method of treating and upgrading the tenderness and sensory qualities of fresh red meats as defined in claim 1 wherein the binder is selected from the group consisting of plant hydrocolloids, starch gels, pectin gels, gelatin gels, and phosphate salts.

12. A method of treating and upgrading the tenderness and sensory qualities of fresh red meats as defined in claim 1 wherein the injectate includes water.

13. A method of treating and upgrading the tenderness and sensory qualities of fresh red meats as defined in claim 1 wherein the injectate include at least one unsaturated fat.

14. A method of treating and upgrading the tenderness and sensory qualities of fresh red meats as defined in claim 13 wherein the at least one unsaturated fat is selected from the group consisting of corn oil, soybean oil, cottonseed oil, sunflower oil, or peanut oil.

15. A method of treating and upgrading the tenderness and sensory qualities of fresh red meats as defined in claim 1 wherein the injectate further comprises at least one flavoring.

16. A method of treating and upgrading the tenderness and sensory qualities of fresh red meats as defined in claim 15 wherein the at least one flavoring is selected from the group consisting of bouillon, MSG, natural meat flavor extract, and synthetic meat flavor extract.

17. A method of treating and upgrading the tenderness and sensory qualities of fresh red meat as defined in claim 1 wherein the injectate comprises at least one saturated fat.

18. A method of treating and upgrading the tenderness and sensory qualities of fresh red meats as defined in claim 17 wherein the saturated fat is beef tallow.

* * * * *

UNITED STATES PATENT AND TRADEMARK OFFICE
CERTIFICATE OF CORRECTION

PATENT NO. : 5,053,237

DATED : October 1, 1991

INVENTOR(S) : DELOY G. HENDRICKS et al.

It is certified that error appears in the above-identified patent and that said Letters Patent is hereby corrected as shown below:

```
Abstract, line 11, "prefereed" should be --preferred--
Column 5, line 42, after "qualities" insert --of--
Column 6, line 67, after "Since the" insert --injectate--
Column 7, line 32, "atkomatic" should be --automatic--
Column 12, line 37, after "first," sentence should continue
on same line
Column 16, line 24, "include" should be --includes--
```

Signed and Sealed this

Eighth Day of June, 1993

Attest:

MICHAEL K. KIRK

Attesting Officer

Acting Commissioner of Patents and Trademarks